(12) United States Patent
Urata

(10) Patent No.: US 11,851,929 B2
(45) Date of Patent: Dec. 26, 2023

(54) HOLDER-EQUIPPED WINDOW GLASS

(71) Applicant: AGC INC., Tokyo (JP)

(72) Inventor: Ryoichi Urata, Chiyoda-ku (JP)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 17/196,056

(22) Filed: Mar. 9, 2021

(65) Prior Publication Data

US 2021/0293068 A1   Sep. 23, 2021

(30) Foreign Application Priority Data

Mar. 23, 2020  (JP) ................................ 2020-050642

(51) Int. Cl.
| | |
|---|---|
| B60J 1/16 | (2006.01) |
| E05D 15/16 | (2006.01) |
| E05F 15/697 | (2015.01) |
| B60J 1/00 | (2006.01) |
| B60J 1/17 | (2006.01) |

(52) U.S. Cl.
CPC ............ *E05D 15/165* (2013.01); *B60J 1/008* (2013.01); *B60J 1/17* (2013.01); *E05F 15/697* (2015.01); *E05Y 2201/434* (2013.01); *E05Y 2201/64* (2013.01); *E05Y 2201/684* (2013.01); *E05Y 2600/46* (2013.01); *E05Y 2900/55* (2013.01)

(58) Field of Classification Search
CPC . E05D 15/165; B60J 1/008; B60J 1/17; E05F 15/697; E05F 11/385; E05Y 2201/434; E05Y 2201/64; E05Y 2201/684; E05Y 2600/46; E05Y 2600/502; E05Y 2600/526; E05Y 2900/55

USPC ..................................................... 49/374, 375
See application file for complete search history.

(56) References Cited

U.S. PATENT DOCUMENTS

| | | | | |
|---|---|---|---|---|
| 4,449,326 A | * | 5/1984 | Hori ....................... | E05F 11/385 49/352 |
| 4,943,179 A | * | 7/1990 | Horiki ....................... | B60J 1/17 403/267 |
| 4,949,509 A | * | 8/1990 | Gold ........................ | B60J 10/75 49/502 |
| 5,038,519 A | * | 8/1991 | Huebner ............... | E05F 11/385 49/352 |
| 5,363,595 A | * | 11/1994 | Wirsing ................ | E05F 11/385 52/204.597 |
| 5,765,310 A | * | 6/1998 | Gold ........................ | B60J 1/17 49/375 |

(Continued)

FOREIGN PATENT DOCUMENTS

| | | |
|---|---|---|
| JP | A-2001-039155 A | 2/2001 |
| JP | A-2007-237980 A | 9/2007 |

(Continued)

*Primary Examiner* — Jerry E Redman
(74) *Attorney, Agent, or Firm* — Foley & Lardner LLP

(57) ABSTRACT

A holder-equipped window glass includes a window glass having a holder and formed in a curved shape having a first radius of curvature in section in a sliding movement direction in a state where the window glass is mounted on a vehicle. The holder includes a connecting portion and a holder body. The connecting portion extends in a direction away from a lower edge of the holder body, and the connecting portion at least partly includes a circular arcuate portion having a second radius of curvature in section in the sliding movement direction.

7 Claims, 7 Drawing Sheets

(56) References Cited

U.S. PATENT DOCUMENTS

| | | | | |
|---|---|---|---|---|
| 5,987,820 A * | 11/1999 | Shibanushi | ............ | E05F 11/385 49/358 |
| 6,131,339 A * | 10/2000 | Ramus | ................ | E05F 11/385 49/375 |
| 6,349,504 B1 * | 2/2002 | Schmitt | ................ | E05F 11/385 52/127.3 |
| 6,425,208 B1 * | 7/2002 | Klueger | ................ | E05F 11/382 49/502 |
| 6,453,617 B1 * | 9/2002 | Klippert | ................ | E05F 11/385 49/375 |
| 6,729,073 B2 * | 5/2004 | Nicolai | ................ | E05F 11/445 49/375 |
| 6,966,149 B2 * | 11/2005 | Fenelon | ................ | E05F 11/385 49/375 |
| 8,146,645 B2 * | 4/2012 | Pulcini | ................ | E05F 11/385 296/200 |
| 8,171,682 B2 * | 5/2012 | Pulcini | ................ | E05F 11/385 52/204.63 |
| 9,970,226 B2 * | 5/2018 | Stewart | ................ | E05F 11/385 |
| 10,323,448 B2 * | 6/2019 | Koette | ................ | E05F 11/385 |
| 10,487,558 B2 * | 11/2019 | Walawender | ............ | B60J 1/006 |
| 10,851,575 B2 * | 12/2020 | Takahashi | ............ | E05F 11/385 |
| 10,883,299 B2 * | 1/2021 | Walawender | .............. | B60J 1/17 |
| 11,208,838 B2 * | 12/2021 | Robison | ................ | E05D 15/165 |
| 11,261,641 B2 * | 3/2022 | Kleyer | ................ | B60J 1/17 |
| 11,274,485 B2 * | 3/2022 | Kleyer | ................ | B60J 1/006 |
| 2002/0017061 A1 * | 2/2002 | Nicolai | ................ | E05F 11/445 49/375 |
| 2003/0093960 A1 * | 5/2003 | Mizusawa | ............ | E05F 11/385 49/375 |
| 2003/0110702 A1 * | 6/2003 | Capriotti | ............... | E05F 11/385 49/375 |
| 2006/0048452 A1 * | 3/2006 | Sweeney | ............. | E05F 11/385 49/374 |
| 2010/0037543 A1 * | 2/2010 | Pulcini | ................ | E05F 11/385 156/60 |
| 2017/0306677 A1 * | 10/2017 | Kosaka | ................ | E05F 11/385 |
| 2019/0178019 A1 * | 6/2019 | Takahashi | ............. | E05D 15/165 |
| 2019/0248216 A1 * | 8/2019 | Sauvinet | ................ | B60J 1/008 |

FOREIGN PATENT DOCUMENTS

| | | |
|---|---|---|
| JP | A-2012-246671 A | 12/2012 |
| JP | A-2017-008521-1 | 1/2017 |
| JP | A-2017-094880 A | 6/2017 |

* cited by examiner

HOLDER-EQUIPPED WINDOW GLASS

CROSS REFERENCE TO RELATED APPLICATION

The entire disclosure of Japanese Patent Application No. 2020-050642 filed on Mar. 23, 2020 including specification, claims, drawings and summary is incorporated herein by reference in its entirety.

TECHNICAL FIELD

The present invention relates to a holder-equipped window glass.

BACKGROUND ART

A window glass, which is mounted on a vehicle door so as to be slidably movable, is moved up and down by a driving force from a lifting device (also referred to as a "regulator") attached to a door panel.

For example, the regulator disclosed in Patent Document 1 listed below includes an electric motor and a slider for transmitting power from the electric motor to a window glass. On the other hand, the window glass disclosed in Patent Document 2 listed below has glass holders (holders) partly attached to a lower edge thereof, the glass holders having a common carrier plate as a slider connected to their connecting portions via bolts.

Such holders are attached to a projecting portion or portions of a window glass, which project downward as disclosed in Patent Documents 2 and 3. The projecting portion or portions and the holders are housed in a door panel without being exposed outside even when the window glass is moved up to its highest position.

PRIOR ART DOCUMENTS

Patent Documents

Patent Document 1: JP-A-2012-246671
Patent Document 2: JP-A-2017-8521
Patent Document 3: JP-A-2017-94880

DISCLOSURE OF INVENTION

Technical Problem

Among the holder-equipped window glasses, a type of holder-equipped window glass, which is slidably moved along a streamlined body line, includes a window glass, which is formed in a curved shape along the body line, and which is slidably moved along a circular arcuate path, being guided by circular arcuate sashes.

Such a holder-equipped window glass needs to perform a smooth sliding movement along the circular arcuate path. Nevertheless, friction resistance caused during the sliding movement have prevented the conventional holder-equipped window glasses from performing a smooth sliding movement in some cases.

The present invention is proposed in consideration of such circumstances. It is an object of the present invention to provide a holder-equipped window glass, which is slidable along a circular arcuate path.

Solution to Problem

In order to achieve the object of the present invention, the present invention provides a holder-equipped window glass, which is attached to a vehicle door and is slidable along a circular arcuate path, including the window glass having a holder attached to a lower edge thereof, the window glass being formed in a curved shape having a first radius of curvature in section in a sliding movement direction in a state where the window glass is mounted on the vehicle; the holder including a connecting portion and at least one holder body, the connecting portion being configured to be connected to a lifting member of a lifting device attached to the vehicle door, and the at least one holder body being configured to hold the window glass at the lower edge in section in the sliding movement direction; and the connecting portion extending in a direction away from a lower edge of the holder body, and the connecting portion at least partly comprising a circular arcuate portion having a second radius of curvature in section in the sliding movement direction.

Advantageous Effects of Invention

The present invention allows a smooth sliding movement along a circular arcuate path.

DESCRIPTION OF EMBODIMENTS

Now, embodiments of the present invention will be described in reference to the accompanying drawings.

In Description, the wordings of "upward", "downward", "interior", "exterior", "forward" and "rearward", which are indicative of directions or positions, mean upward, downward, interior, exterior, forward and rearward when a holder-equipped window glass is mounted on a vehicle.

Figure 1:
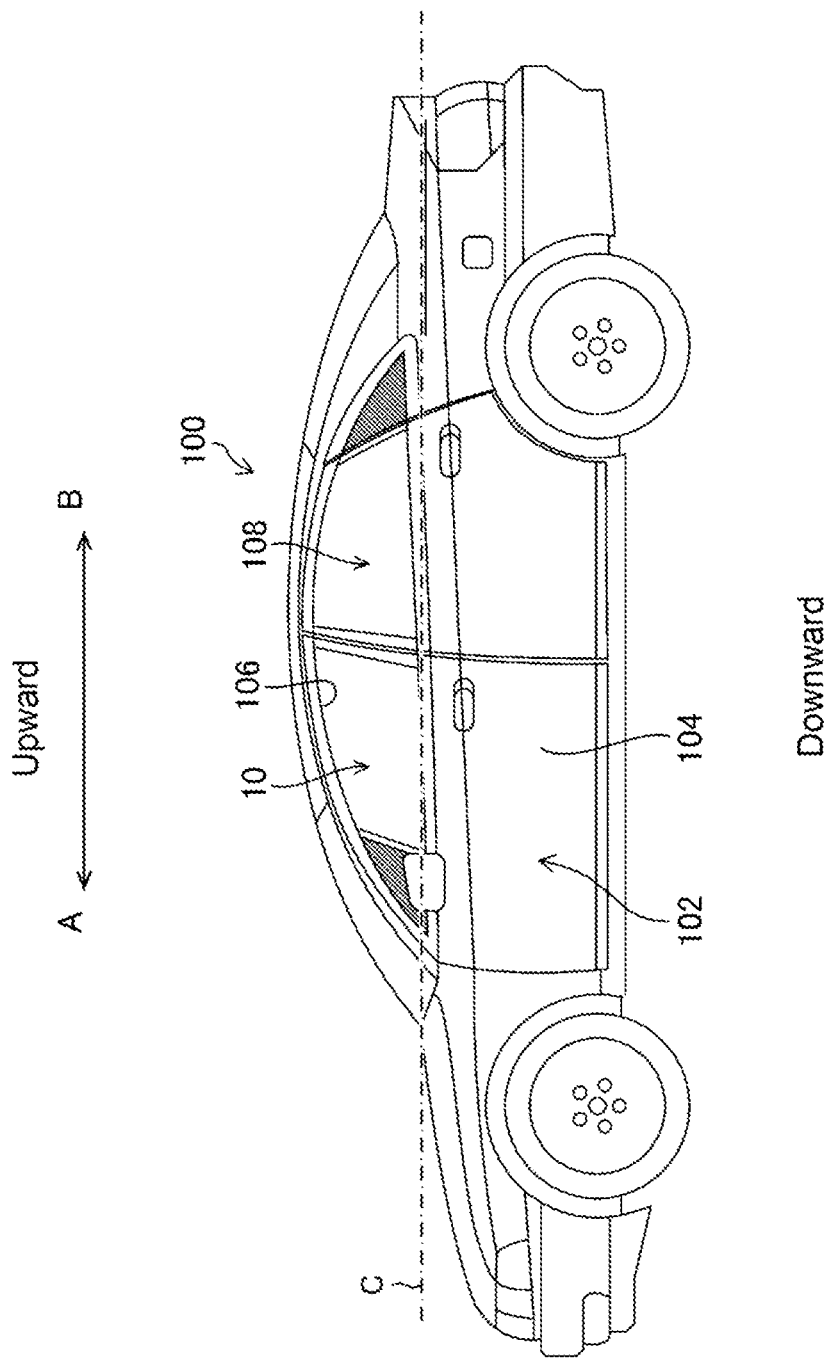
FIG. 1 is a right side view of essential portions of a vehicle on which the holder-equipped window glass according to an embodiment of the present invention is mounted.
Figure 2:
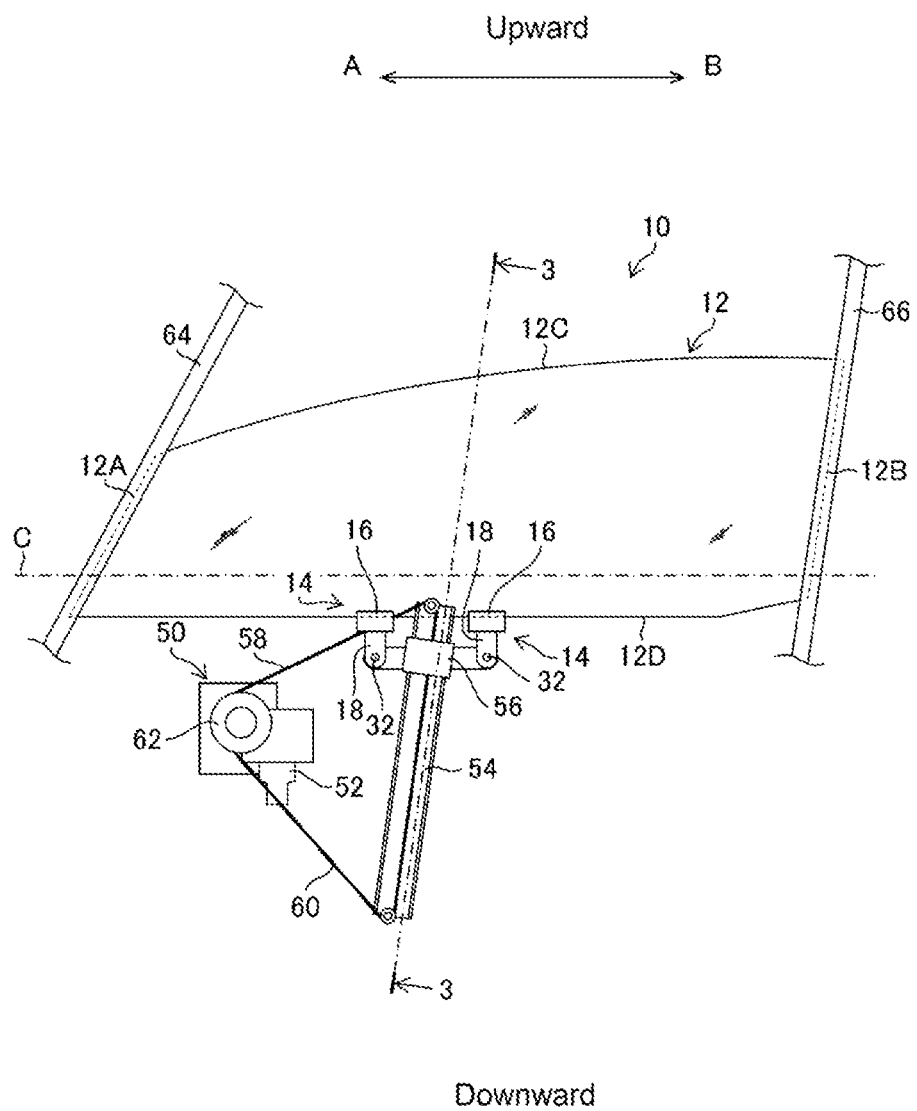
FIG. 2 is a front view illustrating the structure of the holder-equipped window glass shown in FIG. 1.

FIG. 1 is a right side view of a vehicle 100 on which the holder-equipped window glass 10 according to an embodiment of the present invention is mounted. FIG. 2 is a front view illustrating the structure of the holder-equipped window glass shown in FIG. 1. In FIGS. 1 and 2, the vehicle 100 has a forward direction and a rearward direction indicated by arrows A and B, respectively. The vehicle 100 has a belt line indicated by a two-dot chain line C in FIGS. 1 and 2.

As one example, the holder-equipped window glass 10 shown in FIG. 1 is applied to a front sidelite and is assembled to the front side door 102 of the vehicle 100. The holder-equipped window glass 10 is connected to a lifting device 50 attached to the door panel 104 of the front side door 102 (see FIG. 2) and is moved up and down by a driving force from the lifting device 50 to open and close the window opening 106 of the front side door 102. It should be noted that the holder-equipped window glass 10 according to the present invention is also applicable to a rear sidelite 108.

Now, the approximate structure of the lifting device 50 shown in FIG. 2 will be described.

The lifting device 50 includes an electric motor 52 as a driving source, a guide rail 54, a slider 56 as a lifting member, a first wire 58, a second wire 60, and a drum 62. The front side door 102 (see FIG. 1) includes a front sash 64 and a rear sash 66, which guide the lifting movement of the holder-equipped window glass 10 in cooperation with the lifting device 50.

The guide rail 54 is disposed so as to have a longitudinal direction extending along a sliding movement direction of the holder-equipped window glass 10, which will be described later. The guide rail is formed in a circular arcuate shape in the longitudinal direction so as to extend along the sliding movement direction of the holder-equipped window glass 10 (see FIG. 4).

The slider 56 is a member to be connected to the holder-equipped window glass 10 and is engaged with the guide rail 54 so as to be slidably movable along the longitudinal direction of the guide rail 54.

The first wire 58 has a first end connected to the drum 62 and a second end connected to the slider 56. The second wire 60 has a first end connected to the drum 62 and a second end connected to the slider 56.

The front sash 64 supports a forward edge 12A of a window glass 12 forming the holder-equipped window glass 10 so as to make the forward edge slidable, and the rear sash 66 supports a rearward edge 12B of the window glass 12 so as to make the rearward edge slidable. Each of the front sash 64 and the rear sash 66 is disposed to have a longitudinal direction thereof extending along the sliding movement direction of the holder-equipped window glass 10 and is formed in a circular arcuate shape in the longitudinal direction so as to extend along the sliding movement direction of the holder-equipped window glass 10 (see FIG. 4).

In the lifting device 50 thus configured, when the drum 62 is rotated in one direction by the electric motor 52, the first wire 58 is wound on the drum 62 while the second wire 60 is fed out from the drum 62. By this arrangement, the slider 56 is moved up along the guide rail 54 such that the holder-equipped window glass 10 is moved up along a circular arcuate path D (see FIG. 3) following the longitudinal shape of the guide rail 54, being guided by the front sash 64 and the rear sash 66.

In contrast, when the drum 62 is rotated in the opposite direction by the electric motor 52, the first wire 58 is fed out from the drum 62 while the second wire 60 is wound on the drum 62. Thus, the slider 56 is moved down along the guide rail 54 such that the holder-equipped window glass 10 is moved down along the circular arcuate path D (see FIG. 3), being guided by the front sash 64 and the rear sash 66.

Figure 3:
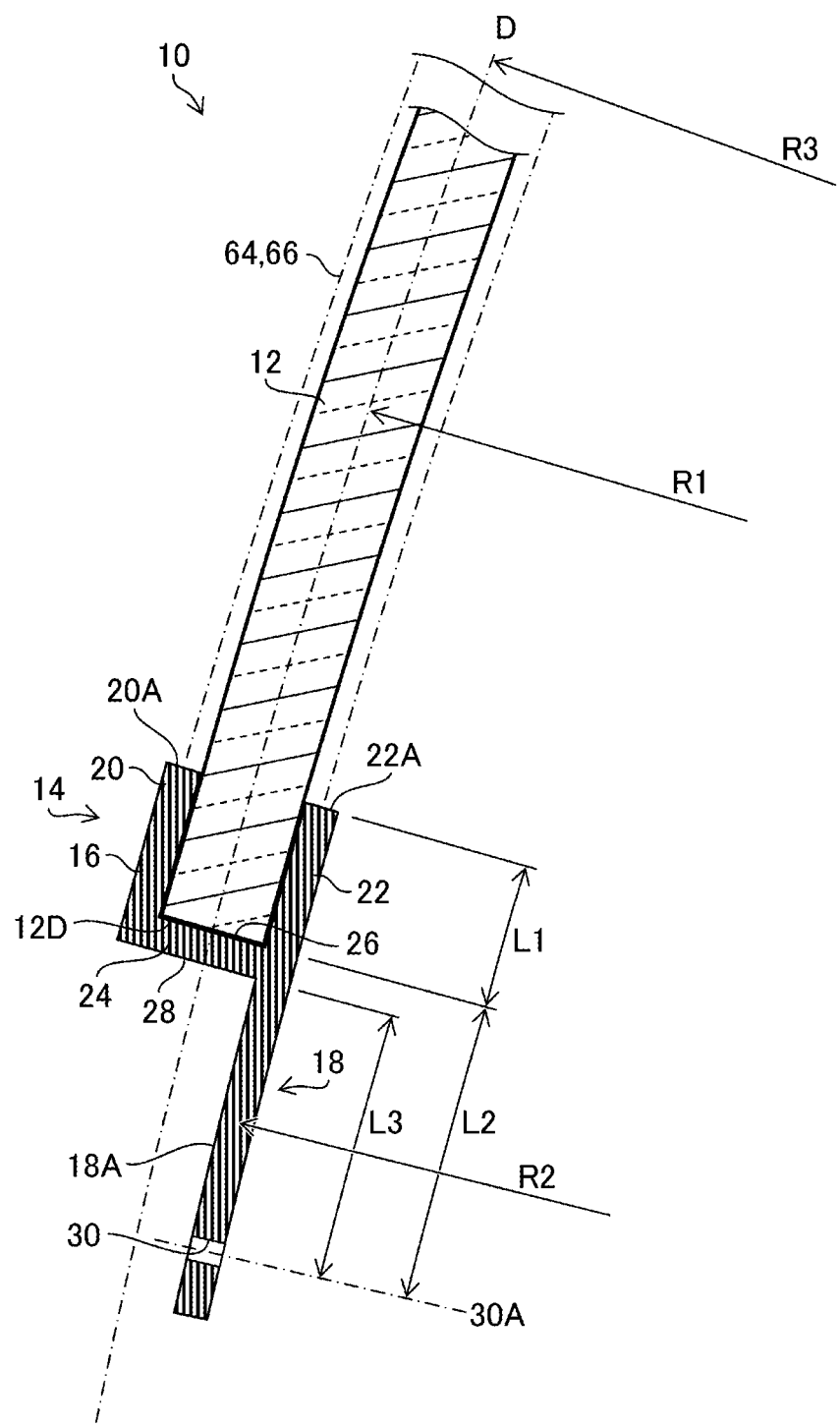
FIG. 3 is a cross-sectional view of a holder shown in FIG. 2, taken along line 3-3 in FIG. 2.

FIG. 3 is a cross-sectional view of the holder-equipped window glass 10 shown in FIG. 2, taken along line 3-3 in FIG. 2. In other words, FIG. 3 is a cross-sectional view of the holder-equipped window glass 10, which is taken when the vehicle 100 is seen from its rearward side toward its forward side, and which is taken in the sliding movement direction of the holder-equipped window glass 10. It should be noted that the guide rail 54 is not shown to simply explain the structure of the holder-equipped window glass 10.

Explanation of the embodiments will be made about a case where a single glass plate is exemplified as the window glass 12 forming the holder-equipped window glass 10. The circular arcuate path D corresponding to the sliding movement direction of the holder-equipped window glass 10 is indicated by a dashed dotted line in FIG. 3, and the center of the radius of curvature of the path D is located at an interior side. That is to say, the path D has a curved shape to be convex from the interior side toward an exterior side. The front sash 64 and the rear sash 66 show in FIGS. 1 and 2 are indicated by two-dot chain lines in FIG. 3.

As shown in FIGS. 2 and 3, the window glass 12 is formed in a substantially trapezoidal shape in a front view (see FIG. 2). The window glass 12 is formed in a curved shape having a first radius of curvature R1 in section in the sliding movement direction (see FIG. 3) in a state where the window glass is mounted on the vehicle (see FIG. 1).

When the window glass 12 is mounted on the vehicle 100, the window glass is formed in a curved shape so as to be convex toward the exterior side as shown in FIG. 3. The window glass 12 may be formed in a single bent shape to be curved only in one direction or in a compound bent shape to be curved in two orthogonal directions.

The window glass 12 includes the forward edge 12A, the rearward edge 12B, a top edge 12C and a lower edge 12D, which all form a peripheral area. The lower edge 12D is formed in a substantially liner shape so as to be parallel to the belt line C such that the lower edge 12D has no projecting portion formed thereon. The window glass 12 is not limited to such a shape and may have a projecting portion. The wording "be parallel to" means not only a mode therein the lower edge is perfectly parallel to the belt line but also a mode therein the lower edge 12D is inclined to the belt line C at an angle within about 10 degrees for example.

The window glass 12 may be made of inorganic glass or organic glass. As the inorganic glass, soda-lime glass, aluminosilicate glass, borosilicate glass, alkali-free glass and quartz glass may be, for example, applicable without particular limitations. Among them, soda-lime glass is particularly preferably in terms of production cost and moldability.

When the window glass 12 is made of inorganic glass, the window glass 12 may be made of either non-tempered glass or tempered glass. The tempered glass may be made of either glass tempered by air quenching or chemically tempered glass. Non-tempered glass is prepared by forming molten glass in a plate shape and annealing the formed glass. The tempered glass is prepared by producing a compressive stress layer on the surface of non-tempered glass. The tempered glass may be either physically tempered glass (such as glass tempered by air quenching) or chemically tempered glass. When the physically tempered glass is used, the physically tempered glass may have a glass surface tempered by quenching a uniformly heated glass plate from a temperature close to its softening point or using treatment other than annealing to produce a compressive stress layer on the glass surface by its temperature difference between the glass surface and the inside of the glass plate. When the chemically tempered glass is used, the chemically tempered glass may have a glass surface tempered by producing compressive stress on the glass surface by an ion exchange method or the like after bending. Glass that absorbs ultraviolet rays or infrared rays is also applicable. Although the window glass is preferably transparent, the window glass may be a colored glass plate, which is colored to such an extent not to impair the transparency.

When the window glass 12 is made of organic glass, the organic glass may be made of a transparent resin, such as a polycarbonate resin, an acrylic resin (for example, a polymethyl methacrylate resin), a polyvinyl chloride resin, or a polystyrene resin.

The window glass 12 may be made of laminated glass prepared by bonding at least two glass plates via an interlayer. The interlayer of the laminated glass may be, for example, a known film made of PVB (poly vinyl butyral) or EVA (ethylene vinyl acetate copolymer resin). The interlayer of the laminated glass may be a transparent interlayer or a colored interlayer. The interlayer may have at least two layers.

Although there is no particular limitation to the thickness of the window glass 12, the thickness is preferably at least 0.5 mm and at most 5.0 mm. When the window glass 12 is made of laminated glass, a glass plate that is positioned on the exterior side when the window glass 12 is mounted on the vehicle is preferably at least 1.8 mm and at most 3 mm. The glass plate on the exterior side has a thickness of at least 1.8 mm, the laminated glass has a sufficient strength, such as resistance to flying stones. When the glass plate on the exterior side has a thickness of at most 3 mm, the laminated glass is prevented from being heavy, which is preferable in terms of mileage of the vehicle. The thickness of the glass plate on the exterior side is preferably at least 1.8 mm and at most 2.8 mm, more preferably at least 1.8 mm and at most 2.6 mm. On the other hand, the glass plate that is positioned on the interior side when the window glass 12 is mounted on the vehicle has a thickness of preferably at least 0.3 mm and at most 2.3 mm. When the glass plate on the interior side has a thickness of at least 0.3 mm, the laminated glass is excellent in handling performance. When the glass plate on the interior side has a thickness of at most 2.3 mm, the laminated glass is prevented from being heavy.

The window glass 12 is formed in a curved shape as mentioned above. The window glass 12 may be bent by, e.g., gravity bending, press bending or roller bending. Although there is also no particular limitation to how to bend the window glass 12, it is preferable to use a glass plate formed by a float process or the like when the window glass is made of inorganic glass for example.

As shown in FIGS. 2 and 3, the lower edge 12D of the window glass 12 has a pair of holders 14 and 14 disposed partly thereon so as to be spaced from each other in a direction along the lower edge 12D. The holders 14 may be, for example, made of a metal or a resin. When the holders are made of a resin, examples of the resin include an engineering plastic resin, such as POM (polyacetal), or PBT (polybutyleneterephthalate), a resin with glass fibers mixed in such an engineering plastic resin, and a thermoplastic elastomer resin (such as PP (polypropylene), or PVC (polyvinyl chloride)) having a lower hardness than POM.

Each of the holders 14 includes a holder body 16 and a connecting portion 18.

The holder body 16 is formed in a U-shape in section in the sliding movement direction of the holder equipped window glass 10 as shown in FIG. 3 in order to hold the window glass 12 at the lower edge 12D. Specifically, the holder body 16 includes a pair of opposed side walls 20 and 22, and a bottom wall 24 connecting lower portions of the paired side walls 20 and 22 and having a bottom surface 26 opposing the end surface of the lower edge 12D of the window glass 12. It should be noted that the end surface of the lower edge 12D may be brought into contact with the bottom surface 26 or opposite to the bottom surface 26 with a gap.

The connecting portions 18 are formed in a plate shape and extend toward the opposite side of the paired side walls 20 and 22 from a lower surface 28 of the lower edge opposite the bottom surface 26 of the bottom wall 24. Thus, the connecting portions 18 extend in a direction to be away from the lower edge 12D when the holder bodies 16 are attached to the lower edge 12D of the window glass 12. Each of the connecting portions 18 has a connection hole 30 formed therein such that each bolt 32 shown in FIG. 2 is inserted and threaded into the corresponding connection hole (not shown) of the slider 56 to connect the holders 14 and 14 to the slider 56.

Each of the connecting portions 18 includes a circular arcuate portion 18A having a second radius of curvature R2 in section in the sliding movement direction of the holder-equipped window glass 10. The circular arcuate portion 18A is formed at a position extending from the lower surface 28 of the bottom wall 24 to the center 30A of the connection hole 30 by a length L3 as one example. It should be noted that L3 is not the shortest length from the lower surface 28 to the center 30A but a circular arcuate length along the circular arcuate portion 18A.

Now, explanation will be made about the relationship among the first radius of curvature R1 of the window glass 12, the second radius of curvature R2 of the circular arcuate portion 18A and a third radius of curvature R3 as the radius of curvature of the path D depicted by the holder-equipped window glass 10 in the sliding movement direction.

The centers of the first radius of curvature R1, the second radius of curvature R2 and the third radius of curvature R3 are located on the interior side. The first radius of curvature R1 is preferably at least 1,000 mm and at most 100,000 mm as one example. The second radius of curvature R2 is also preferably at least 1,000 mm and at most 100,000 mm. From the viewpoint of providing the holder-equipped window glass 10 with smooth sliding movement, although it is preferable for the first radius of curvature R1 and the second radius of curvature R2 to have the same value in order to achieve the smooth sliding movement of the holder-equipped window glass 10, the present invention is not limited to this mode. When each of the connection portions 18 partly includes the circular arcuate portion 18A having the second radius of curvature R2, the smooth sliding movement can be achieved. Explanation about this matter will be described later.

The first radius of curvature R1 and the second radius of curvature R2 may have the same value, the first radius of curvature R1 and the third radius of curvature R3 may have the same value, and the second radius of curvature R2 and the third radius of curvature R3 may have the same value. The first radius of curvature R1, the second radius of curvature R2 and the third radius of curvature R3 preferably have the same value. In this mode, the sliding movement is made further smooth.

Next, it will be described how the holder-equipped window glass 10 thus configured according to the embodiment works.

Figure 4:
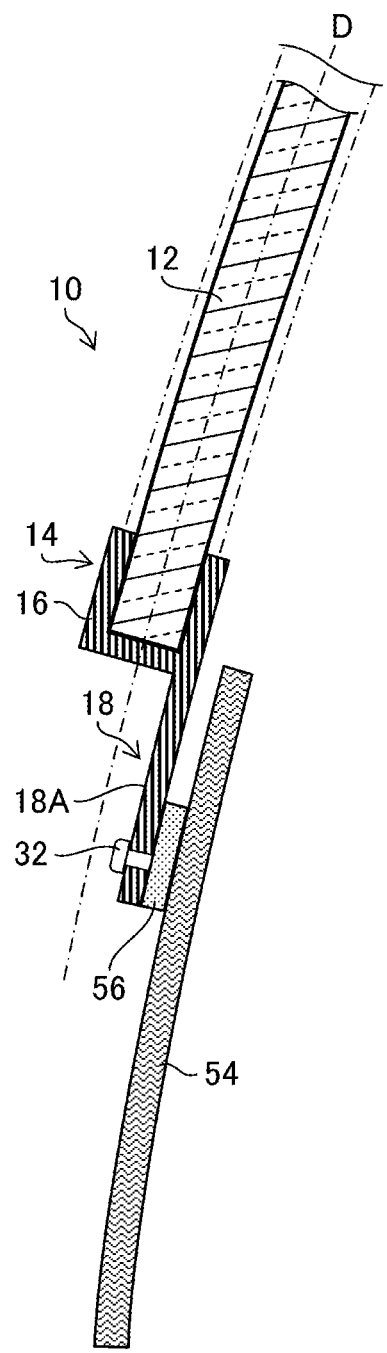
FIG. 4 is a view illustrating how the holder-equipped window glass according to the embodiment performs a sliding movement.

FIG. 4 is a view illustrating how the holder-equipped window glass 10 performs a sliding movement.

As shown in FIG. 4, each of holders 14 is connected to the slider 56 via the corresponding circular arcuate portion 18A having the second radius of curvature R2 (see FIG. 3). The slider 56 is engaged with the circular arcuate guide rail 54, which extends along the path D having the third radius of curvature R3 (see FIG. 3). By this arrangement, when the window glass 12 having the first radius of curvature R1 (see FIG. 3) is slidably moved along the path D, the slider 56 performs the sliding movement with a certain friction resistance being constantly applied to the guide rail 54.

Now, a comparative example will be explained in reference to the holder-equipped window glass 70 shown in FIG. 5.

Figure 5:
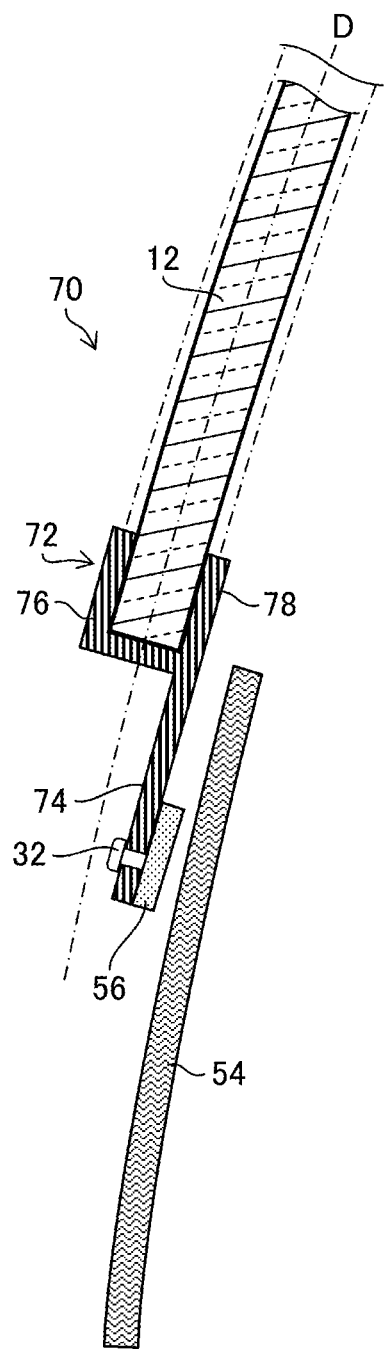
FIG. 5 is a view illustrating how the holder-equipped window glass according to a comparative example performs a sliding movement.

The holder-equipped window glass 70 shown in FIG. 5 includes holders 72, each of which has a connecting portion 74 formed in a flat plate shape. In other words, each connection portion 74 shown in FIG. 5 extends linearly from one of the side walls 78 of the corresponding holder body 76 and has no circular arcuate portion 18A having the second radius of curvature R2 shown in FIG. 3.

In the holder-equipped window glass 70 shown in FIG. 5, when each connecting portion 74 is bound to the slider 56, the slider 56 changes from its inherent sliding movement attitude (see FIG. 4) to an attitude to be away toward the exterior side, being governed by the shape of the connecting portion 74. Thus, a friction resistance between the guide rail 54 and the slider 56 increases in comparison with the embodiment shown in FIG. 4 to prevent the holder-equipped window glass 70 shown in FIG. 5 from performing a smooth sliding movement along the path D.

In contrast, the holder-equipped window glass 10 according to the embodiment shown in FIG. 4 is configured such that the connecting portion 18 of each of the holders 14 includes the circular arcuate portion 18A having the second radius of curvature R2, and each of the holders 14 is connected to the slider 56 via the corresponding circular arcuate portion 18A. Thus, the holder-equipped window glass can perform a smooth sliding movement along the circular arcuate path D.

Although each of the holders 14 according to this embodiment is configured such that a portion having a length L3 as a part of the connecting portion 18 is formed as the circular arcuate portion 18A, the entire connecting portion 18 may be formed as the circular arcuate portion. The side walls 20 and 20 of each of the holder body 16 may include a circular arcuate portion having the second radius of curvature R2.

It is preferred in terms of weight reduction of the window glass 12 that each of the holders 14 according to this embodiment is configured as follows:

Each of the holders 14 is configured such that when, as shown in FIG. 3, the length to the bottom surface 26 from top surfaces 20A and 22A of the paired side walls 20 and 22 of the holder body 16 is defined as L1, and the length to the center 30A of the connection hole 30 from the bottom surface 26 of the holder is defined as L2, formula of L1×2≤L2 is satisfied.

The projecting portion of the window glass disclosed in Patent Document 2 and the projecting portions of the window glass disclosed in Patent Document 3 have a downward projecting amount of substantially at least twice the length L1. From this point of view, when the length L2 is set to a length of not shorter than L1×2, the connecting portions 18 of the holders 14 can replace for the projecting portion and the projecting portions. In the embodiment, the projecting portion and the projecting portions can be removed or the projecting amount of the projecting portion and the projecting portions can be reduced, such that the lower edge 12D of the window glass 12 is made parallel to the belt line C as shown in FIG. 2, or the lower edge 12D is brought closer to the belt line C. Thus, the window glass 12 according to this embodiment can achieve weight reduction in comparison with conventional window glasses having a projecting portion or projecting portions.

The paired side walls 20 and 22 of the holder 16 shown in FIG. 3 have an equal height. When the paired side walls are configured to have different heights, L1 may be set to a distance to the bottom surface 26 from the top surface of a lower side wall.

Although the present invention has been described in detail, the present invention is not limited to the above-mentioned embodiment. Numerous modifications and changes can be made to the embodiment without departing from the scope of the present invention.

Figure 6:
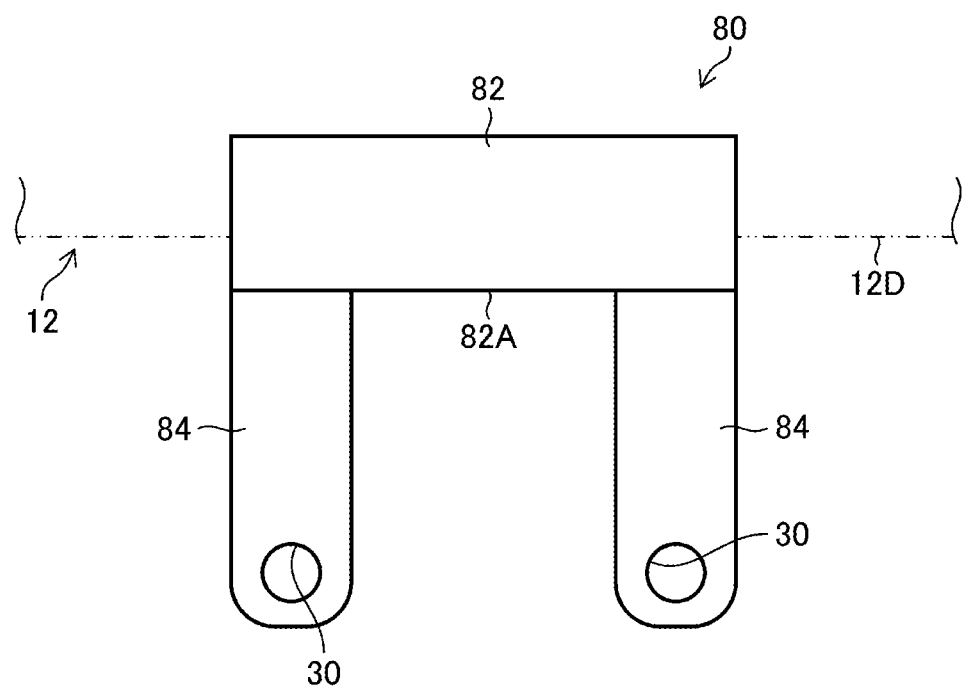
FIG. 6 is a front view illustrating the structure of the holder-equipped window glass according to a modification.

Although the holders 14 according to the embodiment are disposed in pair to be spaced from each other on the lower edge 12D of the window glass 12 as shown in FIG. 2, the holder-equipped window glass may be configured to include a single holder body 82 having a pair of connecting portions 84 and 84 as in a holder 80 as a modification shown in FIG. 6, for example. In other words, the modified holder 80 shown in FIG. 6 may be disposed at a single position on the lower edge 12D of the window glass 12. In this modified holder 80, the paired connecting portions 84 and 84 are disposed on a lower edge 82A of the holder body 82 so as to be spaced in a direction along the lower edge 12D of the window glass 12.

Figure 7A:
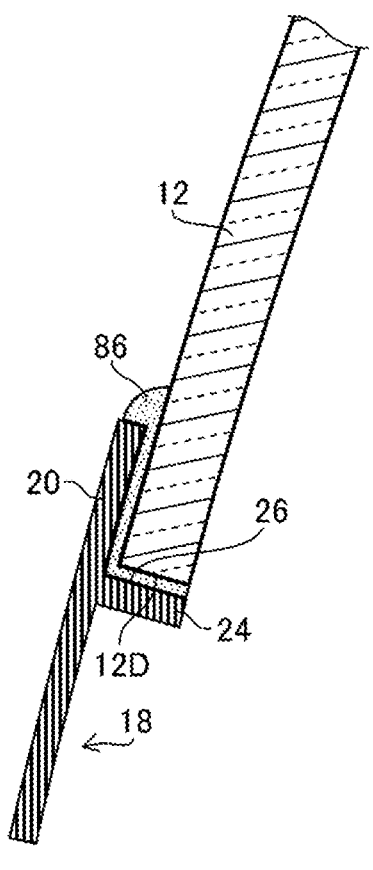
FIGS. 7A and 7B are cross-sectional views illustrating the structure of the holder-equipped window glass according to other modifications.
Figure 7B:
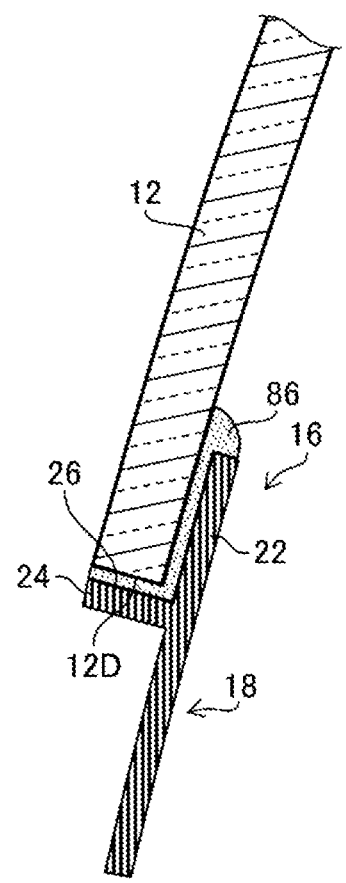

In another alternative, the holder body 16 may be configured to include a side wall 20, and a bottom wall 24 connected to a lower portion of the side wall 20 and having a bottom surface 26 opposing the end surface of the lower edge 12D of the window glass 12 as shown in FIG. 7A. Alternatively, the holder body 16 may be configured to include a side wall 22, and a bottom wall 24 connected to a lower portion of the side wall 22 and having a bottom surface 26 opposing the end surface of the lower edge 12D of the window glass 12 as shown in FIG. 7B. In other words, the holder body 16 may include the side wall 20 or the side wall 22 opposing at least one of principle surfaces of the window glass 12, and the bottom wall 24 having the bottom surface 26 opposing the end surface of the lower edge 12D of the window glass 12. The at least one of principle surfaces of the window glass 12 is bonded to the side wall 20 or the side wall 22 by an adhesive 86. The use of the adhesive 86 is also applicable to the holder-equipped window glass 10 shown in FIG. 3.

What is claimed is:

1. A holder-equipped window glass, which is attached to a vehicle door and is slidable along a circular arcuate path, comprising:

the window glass having a holder attached to a lower edge thereof, the window glass being formed in a curved shape having a first radius of curvature in section in a sliding movement direction in a state where the window glass is mounted on the vehicle;

the holder comprising a connecting portion and at least one holder body, the connecting portion being configured to be connected to a lifting member of a lifting device attached to the vehicle door, and the at least one holder body being configured to hold the window glass at the lower edge in section in the sliding movement direction; and the connecting portion extending in a direction away from a lower edge of the holder body, and the connecting portion at least partly comprising a circular arcuate portion having a second radius of curvature in section in the sliding movement direction, the sliding movement direction defined by a third radius of curvature;

wherein:

the circular arcuate portion is rigidly held in the second radius, and wherein the second radius of curvature is substantially equal to the third radius of curvature during movement of the window glass between an open position and a closed position;

the holder comprises a pair of holders disposed on the lower edge of the window glass so as to be spaced from each other;

the holder body comprises a side wall opposing at least one of principle surfaces of the window glass, and a bottom wall connected to a lower portion of the side wall, the bottom wall having a bottom surface opposing an end surface of the lower edge of the window glass;

the connecting portion has a connection hole to be connected to the lifting member, the connection hole having a center;

the connecting portion includes a portion having a length L3, the length L3 extends to the center of the connection hole from a lower surface of the bottom wall opposite the bottom surface, and the portion having the length L3 forms the circular arcuate portion; and formula of $L1 \times 2 \leq L2$ is satisfied, wherein L1 is a length to the bottom surface from a top surface of the side wall of the holder body, and L2 is a length to the center of the connection hole from the bottom surface.

2. The window glass according to claim 1, wherein the connecting portion is disposed on the lower edge of the holder body in a direction extending along the lower edge of the window glass.

3. The window glass according to claim 1, wherein the first radius of curvature is at least 1,000 mm and at most 100,000 mm, and the second radius of curvature is at least 1,000 mm and at most 100,000 mm.

4. The window glass according to claim 1, wherein the first radius of curvature and the second radius of curvature have a same value.

5. The window glass according to claim 1, wherein the first radius of curvature, the second radius of curvature and the third radius of curvature have a same value.

6. The window glass according to claim 5, wherein the holder is coupled to a guide rail via a slider and a radius of curvature of the guide rail is the third radius of curvature.

7. The window glass according to claim 1, wherein the holder body comprises a first side wall and a second side wall positioned opposite the first side wall and positioned along the same contact plane as the connecting portion, and wherein the second side wall at least partly comprises a circular arcuate portion having a second radius of curvature.

* * * * *